United States Patent [19]
Turner

[11] 3,952,354
[45] Apr. 27, 1976

[54] SLED

[76] Inventor: Richard W. Turner, 1786 Tubbs St., Thousand Oaks, Calif. 91360

[22] Filed: Oct. 23, 1974

[21] Appl. No.: 517,152

Related U.S. Application Data

[63] Continuation of Ser. No. 380,832, July 19, 1973, abandoned, which is a continuation-in-part of Ser. No. 272,097, July 17, 1972, abandoned, which is a continuation of Ser. No. 94,878, Dec. 3, 1970, abandoned.

[52] U.S. Cl. .................................. 9/310 B; 280/18
[51] Int. Cl.² ......................................... B62B 13/00
[58] Field of Search ........ 280/18; 9/310 B, 310 GT, 9/6

[56] References Cited
UNITED STATES PATENTS

| | | | |
|---|---|---|---|
| 2,139,513 | 12/1938 | Nelson | 280/18 |
| 3,145,400 | 8/1964 | Yoakum | 9/310 GT |
| 3,169,779 | 2/1965 | Haab | 280/18 |
| 3,378,275 | 4/1968 | Rockwood | 280/18 |
| 3,380,090 | 4/1968 | Kenmuir | 9/6 |
| 3,628,804 | 12/1971 | Carreiro | 280/18 |

*Primary Examiner*—Robert R. Song
*Attorney, Agent, or Firm*—Boniard I. Brown

[57] ABSTRACT

A sled for use on snow, grass, sand, and the like, as well as on water. The sled has a body with a relatively sharply upswept prow which projects well above the rear end of the body and slopes upwardly in each lateral direction from a lower central keel rib on the body. The sled is towed by a line attached to the front end of the keel rib. This body shape provides protection for the rider, prevents the body from knifing into the surface over which the sled is moving, and permits steering control of the sled by leaning from side to side. Lines with or without an attached handle may be secured to the prow for use by the rider in maintaining his balance and steering the sled when being towed. The body may have an inclined ramp surface at the underside extending across the rear end of the body for producing a planing action which holds the prow down during motion of the sled through water.

2 Claims, 9 Drawing Figures

INVENTOR
RICHARD W. TURNER
BY
Leonard J. Brown
ATTORNEY

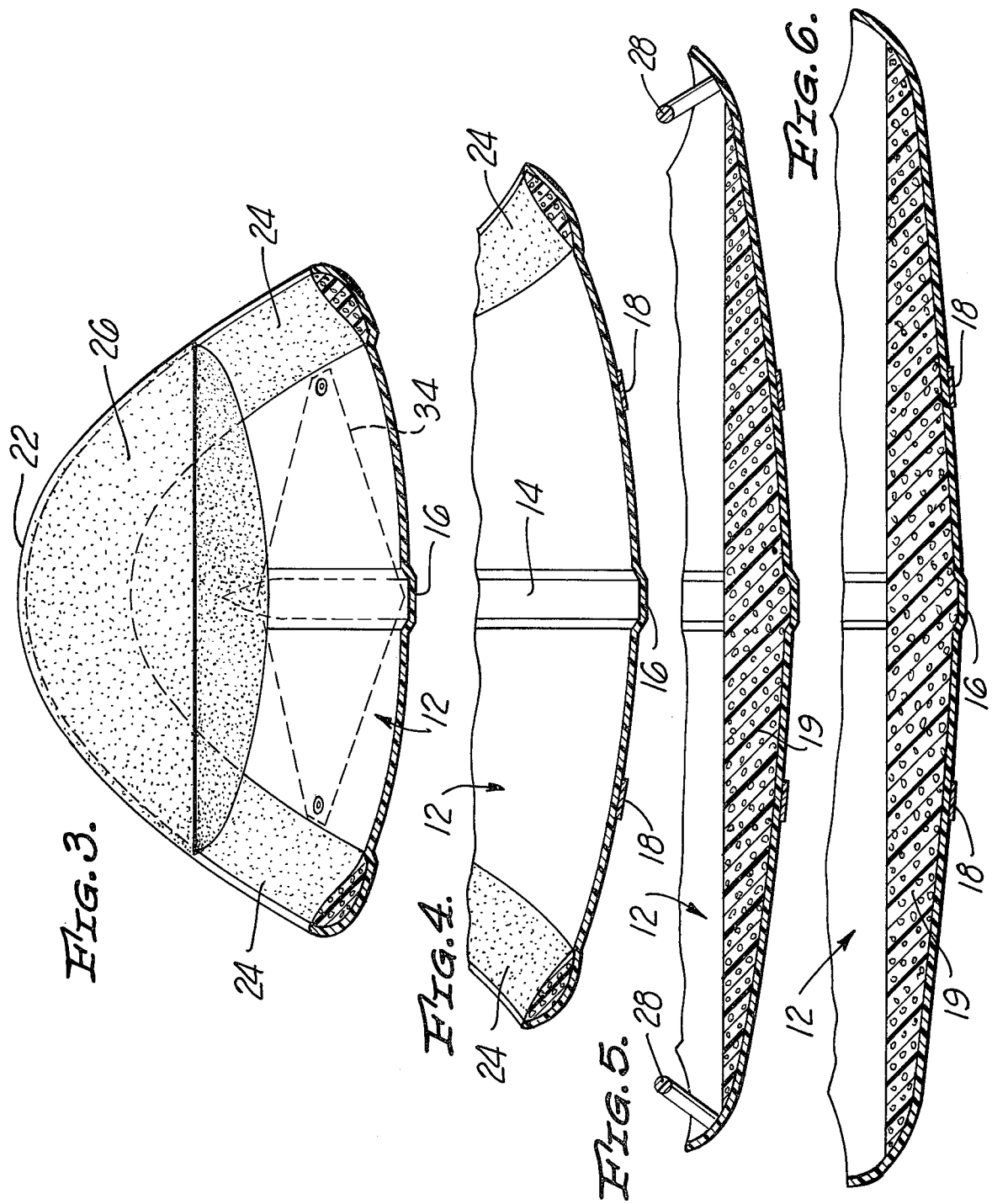

SLED

RELATED APPLICATIONS

This is a continuation of application Ser. No. 380,832, filed July 19, 1973, now abandoned, which is a continuation-in-part of application Ser. No. 272,097, filed July 17, 1972, now abandoned, which, in turn, is a continuation of application Ser. No. 94,878, filed Dec. 3, 1970, now abandoned.

BACKGROUND OF THE INVENTION

1. Field of the Invention

This invention relates generally to the sporting or amusement field and more particularly to a novel sled for use on snow, sand, grass, and the like, as well as on water.

2. Description of the Prior Art

Sleds of the general class to which this invention pertains are known in the art. Examples of such sleds, for example, are found in U.S. Pat. Nos. 2,139,513; 3,394,944; 3,237,222; 3,380,090; 3,145,400 and 2,927,799. Such sleds may be used on a variety of surfaces, such as grass, snow, sand, water, and the like.

SUMMARY OF THE INVENTION

The present invention provides an improved sled of the class described. The sled has a body with upwardly curled longitudinal edges whose front portions curve inwardly toward and merge at the longitudinal centerline of the body to provide the latter with a rounded prow. A seat or seating surface extends across the rear end of the body, and lines with or without an attached handle are secured to the prow for use by the rider in maintaning his balance and steering the sled when being towed.

The front portion of the sled body curves upwardly with a relatively sharp curvature to provide the body with an upswept prow which projects well above the rear seat or seating surface. Also, the under surface of the body slopes upwardly in each lateral direction from a lower central keel rib on the body to its upwardly curled longitudinal edges, such that the prow has a generally broad V-shape in transverse cross-section. This body shape provides protection for the rider, prevents the body from knifing into the surface over which the sled is moving, and permits steering control of the sled by leaning from side to side.

The body may have an inclined ramp surface at its underside which extends across the rear end of the body to produce a planing action in water which holds the prow down.

BRIEF DESCRIPTION OF THE DRAWINGS

FIG. 3 is an enlarged section taken on line 3—3 in FIG. 1;

FIG. 4 is an enlarged section taken on line 4—4 in FIG. 1;

FIG. 5 is an enlarged section taken on line 5—5 in FIG. 1;

FIG. 6 is an enlarged section taken on line 6—6 in FIG. 1;

DESCRIPTION OF THE PREFERRED EMBODIMENT

Figure 1:
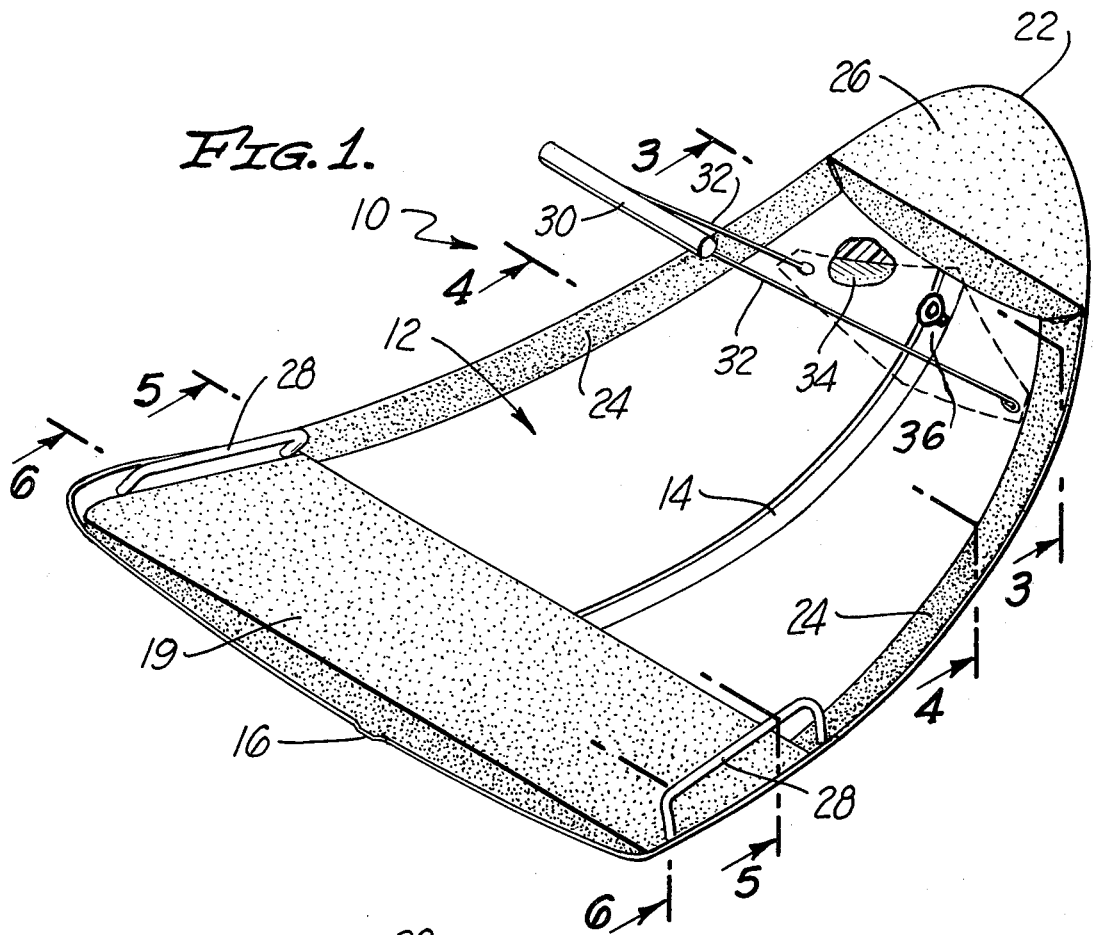
FIG. 1 is a perspective view of the sled.

The sled 10 of the invention illustrated in FIGS. 1–6 has a body 12 of relatively stiff sheet material, such as fiberglass. In the upper side of the body, along its longitudinal centerline, is a channel-like indentation 14 which forms on the underside of the body a projecting keel rib 16. If desired, two additional runners or ribs 18 may be secured to the underside of the body at either side of and parallel to the center keel rib 16. A seat 19 extends across the rear end of the body.

Figure 2:
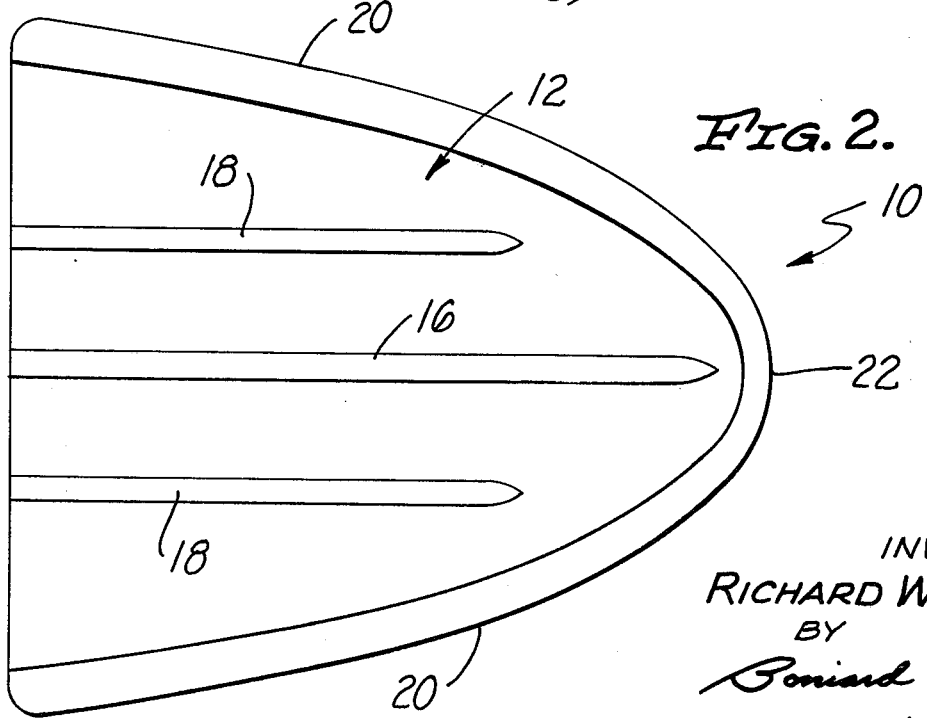
FIG. 2 is a bottom view of the sled.

As shown best in FIGS. 3–6, the sled body 12 slopes upwardly at a small angle in each lateral direction from the center keel rib 16, such that the body has a generally broad V-shape in transverse cross-section. The body has upwardly curled longitudinal edges 20 whose rear portions converge in the forward direction of the sled and whose forward portions curve inwardly toward and merge at the longitudinal centerline of the body. The body thus has a tapered shape in plan view, as shown in FIG. 2, and a rounded prow 22.

Referring to FIG. 1, it will be observed that the sled body 12 curves upwardly with a relatively sharp curvature from its rear end to its front end, such that the prow 22 projects well above the seat 19. This upwardly curved prow provides the dual benefits of preventing the body from knifing forwardly into the surface on which the sled is moving and serving as a shock-absorber and shield for protecting the rider in the event of impact of the sled with a tree, rock or other object. The lateral slope and resulting V-shape of the sled body permits steering central of the body by leaning of the rider from side to side. The upwardly curled edges of the body prevent the latter from knifing laterally into the surface.

According to another feature of the invention, the sled 10 is provided with positive buoyance in water, such that it will float in water and may thus be used as a water sled. Such positive buoyancy may be provided in various ways. In the particular sled shown, the seat 19 is a slab of buoyant material, such as foam plastic. Additional float members 24 and 26 of foam plastic are secured to the upwardly curled longitudinal edges 20 and to the prow 22 of the body. These several foam plastic elements are sized to provide the body with positive buoyancy.

Attached to the sled body 12 at the ends of the seat 19 are handholds 28, which the rider may grasp to steady himself. Lines 32 are attached to a plate 34 embedded in the material of the body for use by the rider in maintaining his balance and steering the sled when being towed. The ends of these lines may be knotted to facilitate gripping the lines or, if desired, a handle 30 may be secured to the lines, as shown.

Attached near the front end of the central indentation 14 is an eye bolt 36v. A tow line, not shown, may be secured to this eye bolt for towing the sled behind a vehicle or boat.

Figure 7:
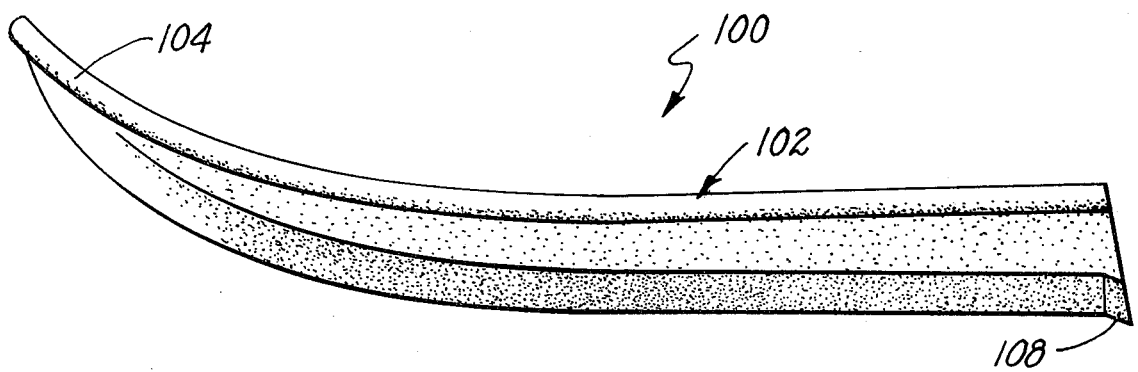
FIG. 7 is a side elevation of a modified sled according to the invention.
Figure 8:
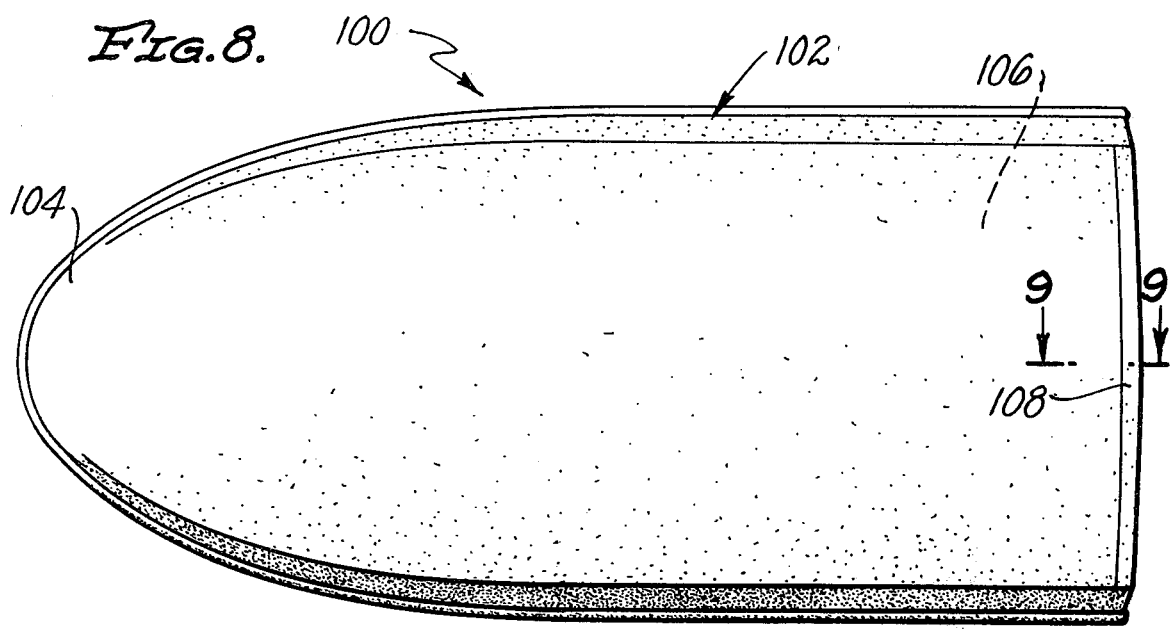
FIG. 8 is a bottom view of the modified sled.
Figure 9:
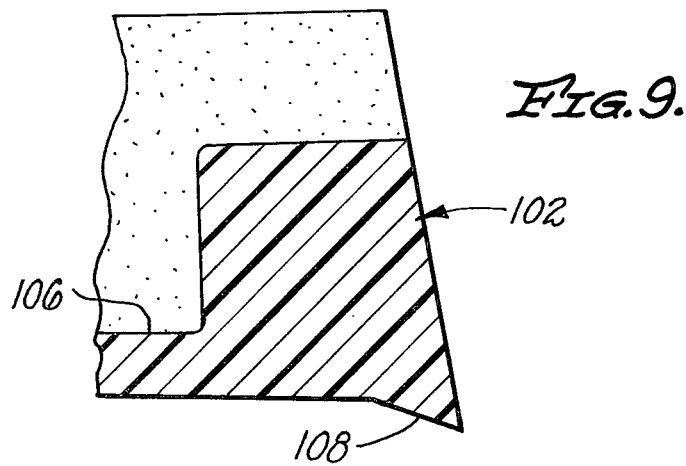
FIG. 9 is an enlarged section taken on line 9—9 in FIG. 8.

The modified sled 100 of FIGS. 7–9 has a body 102 which is similar in shape to that of sled 10. Thus, the sled body 102 has a relatively sharply upswept prow 104 which rises above a rear rider seating surface 106 on the body. The undersurface of the body also curves upwardly in each lateral direction from the longitudinal centerline of the body. Lines (not shown) to be held by the rider may be attached to the prow. The sled is adapted to be towed through the water by means of a tow line (not shown) attached to the prow. The sled body may be molded in one piece from a suitable plastic, such as CL 100 polyethylene filled with closed cell polyurethane.

The primary feature of the modified sled resides in an inclined ramp surface 108 at the underside of the sled body 102. This ramp surface, which is integrally molded on the body, extends across the rear end of the body. As shown best in FIG. 9, the surface 108 inclines downwardly in the rearward direction preferably at an angle on the order of 17½°. During forward motion of the sled through the water, the ramp surface produces a planing action which creates an inward force on the rear end of the body for holding the prow 104 down in the water.

What is claimed as new in support of Letters Patent is:

1. A sled comprising:
 a body having front and rear ends,
 said body having an undersurface which slopes upwardly in each lateral direction from its longitudinal centerline and longitudinal edges whose forward portions curve inwardly toward and merge at said centerline to provide said body with a rounded prow,
 a seat extending across the extreme rear end of said body,
 at least the forward portion of said body curving upwardly with a relatively sharp curvature, whereby said prow is upswept and rises above said seat in a normal sledding position of said sled with a rider on said seat, and
 a downwardly and rearwardly sloping inclined ramp surface at the underside of said body and extending across the extreme rear end of said body directly below said seat, whereby in the normal sledding position of said sled in water with a rider on said seat, said ramp surface is submerged in the water and produces on the rear end of said body an upwardly planing force for holding said prow down in the water when the sled is towed forwardly through the water.

2. A sled according to claim 1 wherein:
 the angle between said ramp surface and the undersurface of the rear end of said body is on the order of 17½°.

* * * * *